United States Patent [19]

Narumiya

[11] Patent Number: 4,560,478
[45] Date of Patent: Dec. 24, 1985

[54] POROUS CERAMIC ARTICLE

[75] Inventor: Tsuneaki Narumiya, Yokohama, Japan

[73] Assignee: Bridgestone Tire Co., Ltd., Tokyo, Japan

[21] Appl. No.: 469,395

[22] Filed: Feb. 24, 1983

[30] Foreign Application Priority Data

Feb. 26, 1982 [JP] Japan ................................. 57-31071
Dec. 17, 1982 [JP] Japan ................................ 57-221590

[51] Int. Cl.⁴ ............................ B01J 9/04; B32B 5/18
[52] U.S. Cl. ..................................... 210/496; 55/523; 210/510.1
[58] Field of Search ............... 210/496, 510.1; 55/523; 501/80, 81, 82; 266/217; 75/68 R

[56] References Cited

U.S. PATENT DOCUMENTS 3,597,165 8/1971 Keith et al. ............................ 55/523
4,258,099 3/1981 Harumiya ....................... 210/510 X

FOREIGN PATENT DOCUMENTS 2324513 12/1973 Fed. Rep. of Germany ...... 210/496

Primary Examiner—Frank Spear
Attorney, Agent, or Firm—Birch, Stewart, Kolasch & Birch

[57] ABSTRACT

A porous ceramic article comprising a porous ceramic body having a three-dimensional network of strands defining interconnected cells is characterized in that at least one compound selected from the group consisting of nitrides, carbides, borides and silicides of metals is dispersed in or deposited on the strands of the porous ceramic body, and the porous ceramic body has a bulk specific gravity of 0.25 to 0.6, an average pore diameter of 0.3 to 10 mm, a porosity of 75 to 95%, and an air pressure drop of 0.1 to 30 mm in water gauge when air passes through the porous ceramic body over a thickness of 1 cm at a velocity of 1 m/sec. The porous ceramic body has improved thermal properties. When needle-like crystals are dispersed in the porous ceramic body, creep resistance and strength at high temperature are both improved.

10 Claims, 1 Drawing Figure

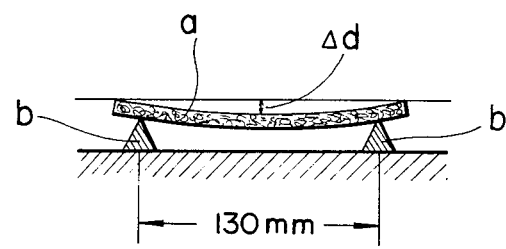

POROUS CERAMIC ARTICLE

BACKGROUND OF THE INVENTION

This invention relates to porous ceramic articles or structures for use as molten metal filters, traps for particulates in exhaust gases such as Diesel engine exhaust gases, other filters, catalyst carriers, energy-saving members such as gas-permeable thermal insulators or the like, particularly at elevated temperatures.

Porous ceramic bodies are prepared by applying a ceramic slurry to an open-cell synthetic resin foam such as reticulated or cell membrane-free flexible polyurethane foam, and drying and sintering the treated foam. They are advantageously used as filters and energy-saving members at elevated temperatures, for example, as filters for removing metal oxides in molten metal such as molten aluminum and trapping particulates in exhaust gases such as Diesel engine exhaust gases, and as gas-permeable thermal insulators or solid heat-transfer transducers to be mounted in a radiant tube or at a heated-gas outlet of a heating furnace to make use of the radiant heat of the gas.

While such a porous ceramic body is used at elevated temperatures, it will possibly be broken because of thermal shock or thermal stress. To increase the resistance of a porous ceramic body to thermal shock due to abrupt temperature changes or thermal stress due to uneven temperature, porous ceramic bodies are formed to have a reduced coefficient of thermal expansion so that stress occurrence is minimized. There is, however, the need for further improving thermal properties such as thermal shock resistance and heat resistance.

Since in such applications, porous ceramic bodies are often exposed to an extremely high temperature environment ranging from several hundred degrees to one thousand degrees centigrade, they are also required to have increased strength at such extremely high temperatures. Preferably the porous ceramic bodies are formed of alumina or cordierite as a main ingredient to achieve such high-temperature strength. There is the need for porous ceramic bodies having further improved high-temperature strength.

SUMMARY OF THE INVENTION

Therefore, it is a primary object of the present invention to provide a porous ceramic article which meets the above-mentioned requirements, that is, has improved thermal properties including thermal shock resistance and heat resistance so that it may well stand extremely high temperatures.

Making extensive investigations to improve the thermal properties of porous ceramic bodies, the inventor has found that a porous ceramic article having improved thermal properties which fully achieves the above object is obtained by using a porous ceramic body having a three-dimensional network of strands defining interconnected cells and having a bulk specific gravity of 0.25 to 0.6, an average pore diameter of 0.3 to 10 mm, a porosity of 75 to 95%, and an air pressure drop of 0.1 to 30 mm in water gauge when air passes through the porous ceramic body over a thickness of 1 cm at a velocity of 1 m/sec. and dispersing or depositing at least one compound selected from the group consisting of nitrides, carbides, borides and silicides of metals, preferably a metal nitride or carbide in or to the strands of the porous ceramic body.

By dispersing or depositing a nitride, carbide, boride or silicide of a metal in or to a porous ceramic body having the above-defined physical properties, the porous ceramic article of the present invention is substantially improved in thermal conductivity and radiation power so that a uniform temperature distribution is achieved throughout the porous ceramic body, resulting in improved thermal shock resistance and heat resistance. When the porous ceramic article of the present invention is used as a solid heat-transfer transducer, a substantial increase in radiation power results in an increase in transducer efficiency, greatly contributing to energy saving. Since the porous ceramic article of the present invention functions to effectively mitigate thermal shock when used in an atmosphere imposing severe temperature conditions, for example, exposed to local heating, it is advantageously used as a Diesel engine particulate trap and gas-permeable thermal insulator.

When needle-like crystals are dispersed in the porous ceramic body having a three-dimensional network of strands defining interconnected cells, creep resistance and strength at high temperatures are both improved to such an extent that the porous ceramic article may advantageously be used in applications exposed to high temperatures such as gas-permeable thermal insulators. A substantially increased strength at high temperatures is provided particularly when needle-like crystals of mullite formed from alumina and silica are dispersed in a porous ceramic body based on alumina or cordierite.

BRIEF DESCRIPTION OF THE DRAWING

The single figure attached is an illustration for the measurement of distortion of a porous ceramic body.

DETAILED DESCRIPTION OF THE INVENTION

The porous ceramic article according to the present invention is based on a porous ceramic body having a three-dimensional network of strands defining interconnected cells through which a fluid may pass. The porous ceramic body is preferably free of clogging or jamming. The porous ceramic body is preferably prepared by applying a ceramic slurry to an open-cell foam of synthetic resin, especially a reticulated or cell membrane-free flexible polyurethane foam, and sintering the treated foam to remove the foam resin through carbonization and form a porous ceramic body having substantially the same cell configuration as the resin foam. Particularly when starting from a reticulated or cell membrane-free flexible polyurethane foam, a porous ceramic body is obtained which is of a cage configuration consisting of the edges of a regular dodecahedron. Such a porous ceramic body of the cage type has a sufficiently increased porosity to allow a fluid such as exhaust gases to pass therethrough without a substantial pressure drop, and comprises interconnected open cells defined by a complicated network of strands upon which a fluid such as exhaust gas impinges during its passage through the cells, removing contaminants in the fluid and providing efficient heat exchange with the fluid.

The material of which the porous ceramic body is made is not particularly limited. Thermal impact ceramic materials containing at least 20% by weight of cordierite are preferred particularly when the ceramic body is used where temperature widely varies, and heat resistant ceramic materials, specifically those containing at least 87% by weight of alumina are preferred particularly when the ceramic body is possibly used at temperatures above 1250° C.

Furthermore, the particularly preferred ceramic bodies from which porous ceramic articles having increased strength at high temperatures are made are ceramic bodies having needle-like crystals dispersed therein, with ceramic bodies having needle-like crystals of mullite formed from alumina and silica dispersed therein being most preferred. The preferred needle-like crystals of mullite ($3Al_2O_3 \cdot 2SiO_2$) are formed by heating a cordierite material having a high alumina content at a temperature (about 1350° C. to 1600° C.) approximate to the decomposition temperature of the cordierite phase. When an alumina-based ceramic material is used to form a porous ceramic body, the alumina contains 70% to 92% by weight of the ceramic body. Further, the needle-like crystals are preferably present in an amount of 1% to 95%, particularly 1% to 20% by weight of the ceramic body.

In preparing a porous ceramic body having needle-like crystals dispersed therein, the crystals may previously be dispersed in a ceramic slurry. In this case, the dispersed ceramic slurry sometimes has a viscosity which too high to carry out immersion or remove excess slurry after immersion, resulting in insufficient immersion or clogging of open-cell bodies. It is therefore, more convenient to form a porous ceramic body by using a needle-like crystal-free ceramic slurry having a composition capable of forming needle-like crystals by sintering, immersing a plastic foam in the slurry, drying the immersed foam after removal of excess slurry, and causing needle-like crystals to form during the subsequent sintering, or by re-heating the sintered porous ceramic body to a sufficient temperature to form needle-like crystals. Either of these procedures successfully produces a porous ceramic body having needle-like crystals dispersed therein.

In the practice of the invention, the porous ceramic body is required to have a bulk specific gravity of 0.25 to 0.6, particularly 0.35 to 0.5, an average pore diameter of 0.3 to 10 mm, particularly 0.5 to 5 mm, a porosity of 75 to 95%, particularly 80 to 90%, and an air pressure drop of 0.1 to 30 mm, particularly 0.1 to 10 mm, in water gauge when air passes through the porous ceramic body over a thickness of 1 cm at a velocity of 1 m/sec. These requirements must be met to provide a useful porous ceramic article having both the characteristics of gas permeability and thermal insulation. Improved porous ceramic articles can be obtained only when all the requirements are satisfied. More specifically, strength is insufficient when the bulk specific gravity is lower than 0.25, whereas the cells of a porous ceramic article tend to be clogged to increase the pressure drop across the body with a bulk specific gravity higher than 0.6. The strength is reduced and the pressure drop is increased with a cell diameter of less than 0.3 mm, whereas a cell diameter of more than 10 mm is also undesirable because of the minimized contact of the article with a flowing fluid. With a porosity of less than 75%, the article is liable to be clogged, resulting in an increased pressure loss. A porosity of more than 95% is also undesirable because of a reduced strength. Furthermore, porous ceramic bodies causing a pressure drop of more than 30 mm are undesirable in applications where a fluid passes therethrough.

The porous ceramic article of the present invention is prepared from a porous ceramic body of the above-defined structure by dispersing at least one compound selected from nitrides, carbides, borides and silicides in the strands of the porous ceramic body, or by coating all the strands of the porous ceramic body or at least those strands of the porous ceramic body which are located at and near the ceramic body inlet for incoming fluid with at least one compound selected from the group consisting of nitrides, carbides, borides and silicides. The dispersion or deposition of such a compound remarkably improves the thermal properties of the porous ceramic body.

The compounds to be dispersed or deposited will be described in detail. The metal nitrides include TiN, ZrN, $Si_3N_4$, HfN, VN, TaN, $Be_3N_2$, AlN, $Th_3N_4$, etc. The metal carbides include TiC, ZrC, HfC, VC, TaC, NbC, WC, BiC, SiC, etc. The metal borides include AlB, SiB, $TiB_2$, $ZrB_2$, $HfB_2$, $VB_2$, TaB, WB, etc. The metal silicides include MoSi, TiSi, ZrSi, VSi, etc. Among these, the metal nitrides and carbides exert improved effect, and TiN, ZrN, $Si_3N_4$, TiC, ZrC, HfC, VC, TaC, NbC, WC, BiC and SiC are particularly preferred.

These compounds may be dispersed in ceramic body strands by incorporating one or more of the above-listed compounds into a ceramic slurry prior to forming of a porous ceramic body therefrom. Also, they may be deposited on ceramic body strands by immersing a preformed porous ceramic body entirely or partially in a dispersion of one or more of the above-listed compounds in water or any suitable solvent and drying or sintering the immersed ceramic body.

The dispersing or depositing compounds selected from metal nitrides, carbides, borides and silicides need not necessarily be cemented between grains thereof. It is rather preferable in view of sintering temperature, cost and particularly, physical properties, to disperse the compounds in the strands of a porous ceramic body formed of cordierite phase, alumina or the like. By incorporating the compounds selected from metal nitrides, carbides, borides and silicides into a ceramic slurry to eventually disperse them in the resultant ceramic body strands, a porous ceramic article with excellent properties may be produced at a considerably lower temperature than the sintering temperature of these compounds.

The amount of the compounds selected from metal nitrides, carbides, borides and silicides dispersed or deposited is not particularly limited and varies with the desired properties. However, smaller amounts will give rise to a problem in improving thermal properties. For such a reason, the compound should be present in an amount of at least 1% by volume based on the total volume of the porous ceramic body, and preferably in an amount of 10% by volume or higher in the case of dispersion and in an amount of 5% by volume or higher in the case of deposition. The upper limit is preferably 97% by volume. That is, the porous ceramic article may preferably consist essentially of 99% to 3% by volume of a porous ceramic body forming material and 1% to 97% by volume of the compound selected from metal nitrides, carbides, borides and silicides.

The porous ceramic articles of the present invention may be used in applications where a fluid at a high temperature is passed therethrough for various purposes. Mostly, they are advantageously used at a place where high-temperature gas or liquid passes, for example, as molten metal filters, catalyst carriers, Diesel engine emission particulate traps, gas-permeable thermal insulators or the like. The most preferred applications of the porous ceramic articles are particulate traps for trapping and removing particulates in Diesel engine emission, and heat-transfer transducers such as gas-permeable thermal insulators which are directly placed in a radiant tube or heating furnace to conduct heat-exchange with high-temperature gas, particularly high-temperature exhaust gas so that the recovered heat may be utilized in the form of radiant heat. In such applications as particulate traps and heat-transfer transducers, the passage of a high-temperature fluid or local heating creates a temperature distribution in a conventional porous ceramic body which in turn, creates a thermal stress, causing failure of the body. However, since the porous ceramic article of the present invention uses as the porous ceramic body having a three-dimensional network of strands defining interconnected cells a porous ceramic body having a bulk specific gravity of 0.25 to 0.6, an average pore diameter of 0.3 to 10 mm, a porosity of 75 to 95%, and an air pressure drop of 0.1 to 30 mm in water gauge when air passes through the porous ceramic body over a thickness of 1 cm at a velocity of 1 m/sec. and has at least one compound selected from the group consisting of nitrides, carbides, borides and silicides of metals dispersed in or deposited on the strands of the ceramic body, it is fully resistant to severe temperature conditions for example, local heating, experiences minimized thermal stress because of rapid uniforming of temperature, and has significantly improved thermal shock resistance, heat resistance, and radiant power so that it can be used as a particulate trap and solid heat-transfer transducer with a great advantage.

When needle-like crystals are dispersed in a porous ceramic body, thermal strength and high-temperature creep resistance are substantially improved.

In order to further illustrate the present invention, examples thereof will be shown. However, the present invention is not limited to the below-mentioned examples. All parts are by weight.

EXAMPLE 1

A piece of 100 mm long by 50 mm wide by 20 mm thick was cut from a cell membrane-free reticulated flexible polyurethane foam having interconnected open cells, immersed in a dispersion of 100 parts of silicon nitride, 5 parts of flux, and 5 parts of an organic binder in 300 parts of water immediately after preparation thereof, removed from the dispersion and dried, and then sintered at 1300° C. in flowing nitrogen. The resulting porous ceramic body was found to have a bulk specific gravity of 0.43, an average pore diameter of 1 mm, an air pressure drop of 12.0 mm in water gauge across a thickness of 1 cm at an air velocity of 1 m/sec., and a porosity of 86.6%.

The porous ceramic body was heated in an electric oven at a temperature of 1100° C. for 10 hours while it was supported in two opposed positions spaced 40 mm from the center. A distortion at the center of the heated ceramic body was determined to be 1 mm.

EXAMPLE 2

A flat place of 500 mm by 50 mm by 25 mm thick was cut from a cell membrane-free reticulated flexible polyurethane foam having interconnected open cells, immersed in a dispersion of 30 parts of silicon carbide, 70 parts of alumina, 10 parts of cordierite, 10 parts of clay, and 5 parts of flux in 350 parts of water, removed from the dispersion and dried, and then sintered at 1500° C. in flowing nitrogen. The resulting porous ceramic body was found to have a bulk specific gravity of 0.37, an average pore diameter of 2 mm, an air pressure sure drop of 1.0 mm in water gauge across a thickness of 1 cm at an air velocity of 1 m/sec., and a porosity of 89.2%.

In an intermittent hot air blowing oven, the porous ceramic body was alternately subjected to hot air at 1300° C. and room temperature air each pass for 5 minutes up to 30 passes in total. No crack was found in the ceramic body after its removal from the oven.

EXAMPLE 3

A porous ceramic body having a three-dimensional network of strands defining interconnected open cells was produced by applying a ceramic slurry prepared from a ceramic material containing 85% by weight of alumina, silica and other constituents to a cell membrane-free reticulated flexible polyurethane foam, drying the treated foam, and sintering it at a maximum temperature of 1450° C. The porous ceramic body obtained was free of clogging in any direction.

The porous ceramic body was examined by electron microscopic photography (magnifying power ×1000) to find that needle-like crystals of mullite were dispersed in the body.

The porous ceramic body was also found to have a bulk specific gravity of 0.42, an average pore diameter of 2 mm, an air pressure drop of 10 mm in water gauge across a thickness of 1 cm at an air velocity of 1 m/sec., and a porosity of 87.7%.

The porous ceramic body was subjected to a heat distortion test. As shown in the accompanying FIGURE, a porous ceramic body specimen a (150 mm long, 50 mm wide, and 20 mm thick) was placed on two spaced supports b, b and heated to a temperature of 1400° C. for the measurement of a distortion $\Delta d$ of the specimen. No distortion was observed in this specimen, that is, $\Delta d = 0$ mm, which proved that high-temperature creep resistance was excellent.

It is evident that the porous ceramic article having needle-like crystals dispersed therein is useful in the above-described applications.

What is claimed is:

1. A porous ceramic article comprising a porous ceramic body having a three-dimensional network of strands defining interconnected cells, characterized in that the porous ceramic body has a bulk specific gravity of 0.25 to 0.6, an average pore diameter of 0.3 to 10 mm, a porosity of 75 to 95%, and an air pressure drop of 0.1 to 30 mm in water gauge when air passes through the porous ceramic body over a thickness of 1 cm at a velocity of 1 m/sec, and needle-like crystals dispersed in the porous ceramic body which is formed by heating a ceramic material containing 70–92% by weight of alumina on the basis of the weight of the porous ceramic body. deposited on the strands of the porous ceramic body.

2. The porous ceramic article according to claim 1 wherein said porous ceramic body is prepared by applying a ceramic slurry to an open-cell synthetic resin foam, and drying and sintering the treated foam to remove the foam resin through carbonization and form a porous ceramic body having substantially the same cell configuration as the starting resin foam.

3. The porous ceramic article according to claim 2 wherein said open-cell synthetic resin foam is a reticulated flexible polyurethane foam.

4. The porous ceramic article according to claim 1 wherein the porous ceramic body is based on alumina or cordierite, and the needle-like crystals are of mullite.

5. The porous ceramic article according to claim 1 wherein at least one compound selected from the group consisting of nitrides, carbides, borides and silicides of metals is dispersed in or deposited on the strands of the porous ceramic body.

6. The porous ceramic article according to claim 5 wherein the compound dispersed in or deposited on the strands of the porous ceramic body is a metal nitride or carbide.

7. The porous ceramic article according to claim 6 wherein the metal nitrides and carbides are selected from the group consisting of TiN, ZrN, $Si_3N_4$, TiC, ZrC, HfC, VC, TaC, NbC, WC, BiC and SiC.

8. The porous ceramic article according to claim 5 wherein said article consists essentially of 99% to 3% by volume of a porous ceramic body-forming material and 1% to 97% by volume of the compound dispersed in or deposited on the strands of the porous ceramic body.

9. The porous ceramic article according to claim 1 wherein the needle-like crystals are present in an amount of 1 to 90% by weight, based on the wieght of the ceramic body.

10. The porous ceramic article according to claim 1 wherein the needle-like crystals are present in an amount of 1 to 20% by weight, based on the weight of the ceramic body.

* * * * *